United States Patent [19]

Imazeki et al.

[11] 4,386,408
[45] May 31, 1983

[54] TRACER CONTROL SYSTEM

[75] Inventors: Ryoji Imazeki; Etsuo Yamazaki; Takao Sasaki, all of Hachioji; Masashi Yamaguchi, Hino, all of Japan

[73] Assignee: Fujitsu Fanuc Ltd., Tokyo, Japan

[21] Appl. No.: 195,077

[22] Filed: Oct. 8, 1980

[30] Foreign Application Priority Data

Oct. 11, 1979 [JP] Japan .................................. 54-131097

[51] Int. Cl.³ ........................ G06F 15/46; G05B 19/19
[52] U.S. Cl. .................................... 364/474; 318/578; 364/168; 364/174
[58] Field of Search ............... 364/474, 520, 168, 170, 364/171, 174; 318/578

[56] References Cited

U.S. PATENT DOCUMENTS

| | | | |
|---|---|---|---|
| 3,976,928 | 8/1976 | Wenzel | 318/578 |
| 4,084,244 | 4/1978 | Flöter | 364/474 |
| 4,224,670 | 9/1980 | Yamazaki | 364/474 |
| 4,266,172 | 5/1981 | Yamazaki | 318/578 |
| 4,296,473 | 10/1981 | Imazeki et al. | 364/474 X |

Primary Examiner—Felix D. Gruber
Attorney, Agent, or Firm—Staas & Halsey

[57] ABSTRACT

During a tracing operation of a tracer head for detecting the surface configuration of a model, the current position of the tracer head in the Z-axis direction is detected and a maximum value of the detected tracer head positions is stored in a memory means. When the tracer head is returned from a trace terminating end to a trace starting end, it is quickly returned to a position corresponding to the sum of the stored maximum value and a constant value.

11 Claims, 6 Drawing Figures

TRACER CONTROL SYSTEM

BACKGROUND OF THE INVENTION

1. Field of the Invention

The present invention relates to a tracer control system which permits an efficient quick-return motion of a tracer head from the terminating end of a trace path to the starting end of the next trace path.

2. Description of the Prior Art

In conventional tracer control systems, the starting and the terminating end of the trace path and the Z-axis position for quick return use are defined by limit switches. In the case of a one-way scan trace, a limit switch LX1 for the trace starting end, a limit switch LX2 for the trace terminating end and a Z-axis limit switch LZP for quick return use are provided at predetermined positions, as shown in FIG. 1. When it is detected by the operation of the limit switch LX2 that the tracer head has reached the terminating end of a trace path, the tracer head is quickly returned in the Z-axis direction. When it is detected by the operation of the limit switch LZP that the tracer head has risen up to a height Z at which the tracer head does not strike against a model, the tracer head is quickly returned in the X-axis direction. When it is detected by the operation of the limit switch LX1 that the tracer head has returned to the trace starting end, the tracer head is started to approach the model and when the tracer head arrives at a position spaced a predetermined distance from the model, the tracer head is subjected to deceleration control. When the tracer head moves into contact with the model, pick feed is performed and then the tracer head is started to trace the model surface in the X-axis direction.

The limit switch LZP is placed above the highest level of the model surface, preventing the tracer head from colliding with the model in its quick-return motion in the X-axis direction.

With such an arrangement, however, and also in the case where the model surface has only one peak, the tracer head is always raised higher than the peak in the Z-axis direction; accordingly, when the peak does not lie in the X-axis trace path, the quick-return motion of the tracer head becomes excessive. Further, the prior art system requires adjustment of the position of the limit switch LZP for each model and involves the mechanical limit switches, presenting a problem in terms of reliability.

SUMMARY OF THE INVENTION

In view of the above, it is an object of the present invention to provide a tracer control system which stores the highest level of the model surface in memory means to thereby dispense with mechanical limit switches and performs a quick-return motion of the tracer head corresponding to the height of the model surface, thus providing for enhanced reliability in operation and reduced time for the quick-return motion of the tracer head.

Briefly stated, the tracer control system of the present invention is provided with a counter or like means for detecting the present (that is the current) position of the tracer head during tracing in a direction of its return from the terminating end of a trace path, that is, in the Z-axis direction, and a memory or like means for storing the maximum value of the position of the tracer head in the Z-axis direction during tracing, detected by the detecting means. Upon completion of the tracing operation, the tracer head is quickly returned from the terminating end of the trace path to such a position that corresponds to the sum of the abovesaid maximum value and a predetermined value, thus minimizing the quick-return motion of the tracer head.

DESCRIPTION OF THE PREFERRED EMBODIMENTS

Figure 2:
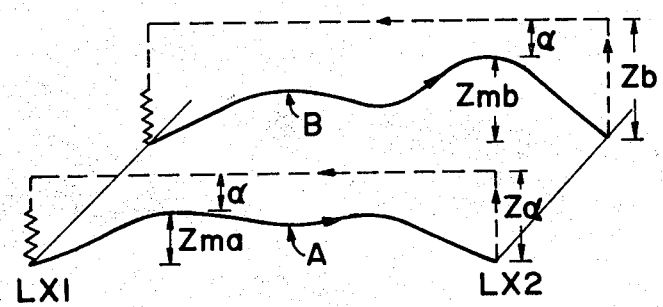
FIG. 2 is a schematic diagram explanatory of a one-way scan trace operation in accordance with an embodiment of the present invention.

FIG. 2 is explanatory of a one-way scan trace operation of an embodiment of the present invention. In this embodiment, the highest levels Zma and Zmb of the model surface in trace paths A and B from the trace starting end to the terminating end are stored. In the quick-return operation of the tracer head, the tracer head is quickly returned to positions, $Za = Zma + \alpha$ and $Zb = Zmb + \alpha$, in the Z-axis direction and then quickly returned in the X-axis direction. Accordingly, if $Zma < Zmb$, then $Za < Zb$. When the surface level of the model in the trace paths is low, the distance of quick return in the Z-axis direction becomes short, reducing the time for the quick return operation as a whole.

Figure 3:
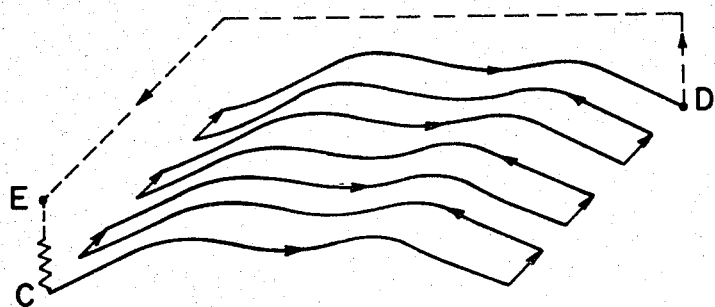
FIG. 3 is a schematic diagram explanatory of a both-way scan trace operation in accordance with another embodiment of the present invention.

FIG. 3 is explanatory of a both-way scan trace operation of another embodiment of the present invention. The tracer head starts tracing from a point C, as indicated by the solid line, and when the tracer head reaches a point D, it is quickly returned, as indicated by the broken line. Then when arriving at a point E, the tracer head starts to approach the model. In this case, the height of the highest point in the trace path from the point C to the point D is stored and the tracer head is quickly returned from the point D to a position higher than the highest point by a predetermined distance.

Figure 4:
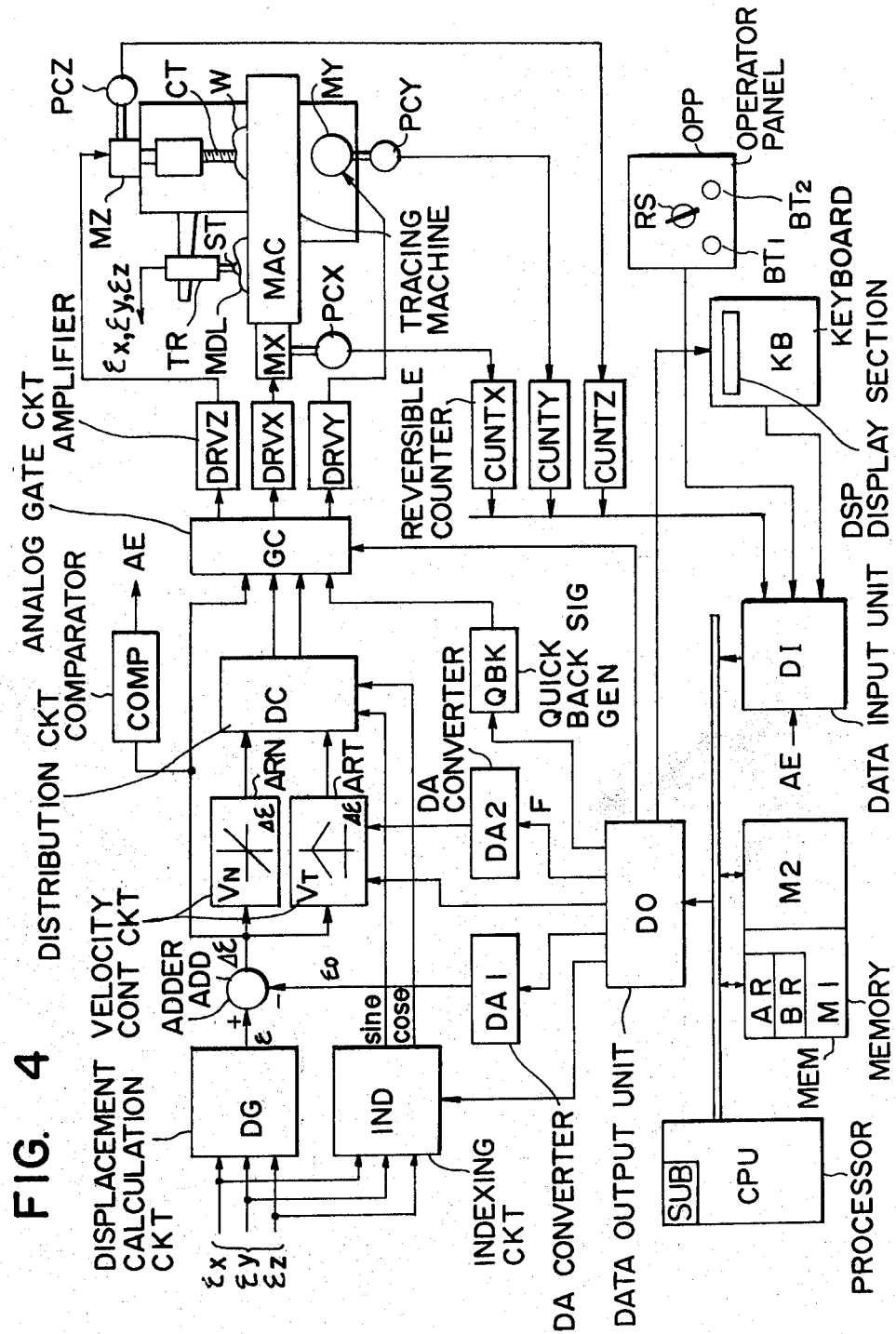
FIG. 4 is a block diagram illustrating a specific arrangement of the present invention.

FIG. 4 illustrates in block form a specific arrangement of the tracer control system of the present invention. In FIG. 4, reference character DG indicates a displacement calculation circuit which is supplied with displacement signals $\epsilon_x$, $\epsilon_y$ and $\epsilon_z$ from a tracer head TR to provide a composite displacement signal, $\epsilon = \sqrt{\epsilon_x^2 + \epsilon_y^2 + \epsilon_z^2}$; IND designates an indexing circuit which is also supplied with the displacement signals $\epsilon_x$, $\epsilon_y$ and $\epsilon_z$ to produce direction-of-displacement signals $\sin \theta$ and $\cos \theta$; ADD identifies an adder which yields a difference $\Delta \epsilon$ between the composite displacement signal $\epsilon$ and a reference displacement signal $\epsilon_0$; ARN and ART denote velocity control circuits which provide a normal-direction velocity signal $V_N$ and a tangential-direction velocity signal $V_T$, respectively; DC represents a distribution circuit which derives a velocity command signal from the normal-direction velocity signal $V_N$ and the tangential-direction velocity signal $V_T$ in accordance with the direction-of-displacement signals $\sin \theta$ and cos θ; COMP shows a comparator which provides an approach end signal AE when Δε=0; DA1 and DA2 refer to D-A converters; GC indicates an analog gate circuit; DRVX, DRVY and DRVX designate amplifiers; MX, MY and MZ identify servo motors; PCX, PCY and PCZ denote position detectors; CUNTX, CUNTY and CUNTZ represent reversible counters which count pulses from the position detectors to indicate the present position of the tracer head; MAC shows a tracing machine; W refers to a work; MDL indicates a model; CT designates a cutter; TR identifies a tracer head; ST denotes a stylus; OPP represents an operator panel; RS shows a setting dial for velocity or the like; BT1 and BT2 indicate push buttons; KB designates a keyboard; DSP identifies a display section; DI denotes a data input unit; DO represents a data output unit; MEM shows a memory composed of a data memory part M1 and a control program part M2; BUS refers to a data bus; CPU indicates a processor; and QBK designates a quick back signal generator.

The data memory part M1 of the memory MEM has inputted thereto from the keyboard KB or the like and stored therein modes of operation such as one-way scan trace, both-way scan trace, contour trace and so forth, the reference displacement $\epsilon_0$, the approach axis, direction and velocity, the trace direction and velocity, the pick feed direction, velocity and value, trace starting and terminating ends, the quick-return velocity, etc. Further, registers AR and AB are provided in the data memory part M1.

In the case where the trace mode is the one-way scan trace mode, the trace direction is the X-axis direction, the approach direction is the Z-axis direction and the pick feed direction is the Y-axis direction, the servo motor MX is driven to feed in the X-axis direction the stylus ST is in contact with the surface of the model MDL and the servo motor MZ is driven in accordance with displacement of the stylus ST, cutting the work W by the cutter CT in imitation of the model MDL. Since each operation of such tracing is already known, a detailed description will not be given thereof.

The content of the reversible counter CUNTZ indicates the position of the tracer head in the Z-axis direction. The processor CPU periodically reads out the content of the reversible counter CUNTZ via the data input unit DI for comparison with the content of the register AR of the data memory part M1 and updates the register AR only when the content of the reversible counter CUNTZ is larger than the content of the register AR. Accordingly, a maximum value of the reversible counter CUNTZ during tracing from the trace starting end to the terminating end is set in the register AR, indicating the highest level of the surface of the model MDL. In the quick return from the trace terminating end, a predetermined certain value α is added to the content of the register AR and the added output is set in the register BR and the register AR is cleared.

Further, the processor CPU applies a quick return command via the data output unit DO to the quick back signal generator QBK and controls the analog gate circuit GC so that the servo motor MZ is driven by a signal from the quick back signal generator QBK. The processor CPU periodically reads out and compares the contents of the register BR and the reversible counter CUNTZ and, in the case of coincidence, controls the analog gate circuit GC to drive the servo motor MX, shifting the Z-axis quick-return operation to the X-axis quick-return operation. Accordingly, in the Z-axis quick-return operation, the tracer head TR is brought to the position corresponding to the sum of the maximum height of the model MDL and the certain value α, and in the case where the maximum height of the model MDL is small, the distance of quick return of the tracer head TR in the Z-axis direction is reduced.

Figure 1:
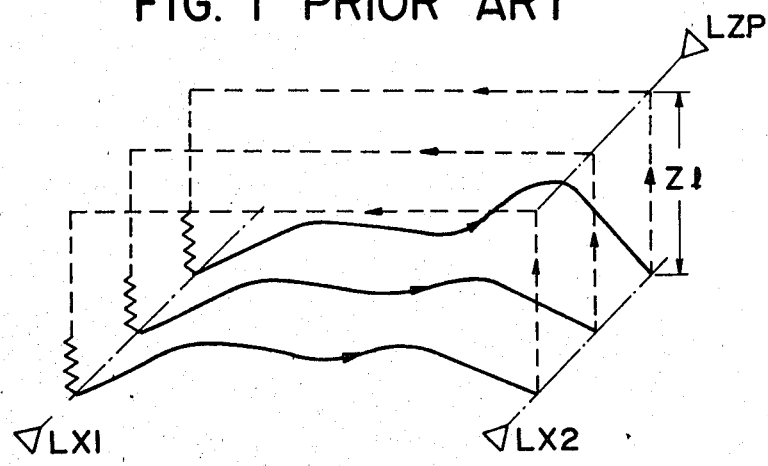
FIG. 1 is a schematic diagram explanatory of a conventional one-way scan trace.

The contents of reversible counters CUNTX and CUNTY respectively indicate the current positions of the tracer head TR in the X-axis and the Y-axis direction. The processor CPU compares the content of the reversible counter CUNTX with the trace starting and terminating ends stored in the data memory part M1 and, in the case of coincidence between the content of the reversible counter CUNTX and the stored trace terminating end, outputs a quick return command to start the aforesaid quick-return operation. When the content of the reversible counter CUNTX and the stored trace starting end coincide with each other as a result of the quick return, the tracer head TR is started to approach towards the model MDL in the Z-axis direction. The end of approach is detected by the comparator COMP and pick feed is started. When the content of the reversible counter CUNTY coincides with the value that the pick value is added to the content of the reversible counter CUNTY at the time of starting the pick feed, the pick feed comes to an end and trace in the X-axis direction is started. In this way, tracer control can be achieved, omitting all the limit switches of the prior art example shown in FIG. 1.

Figure 5:
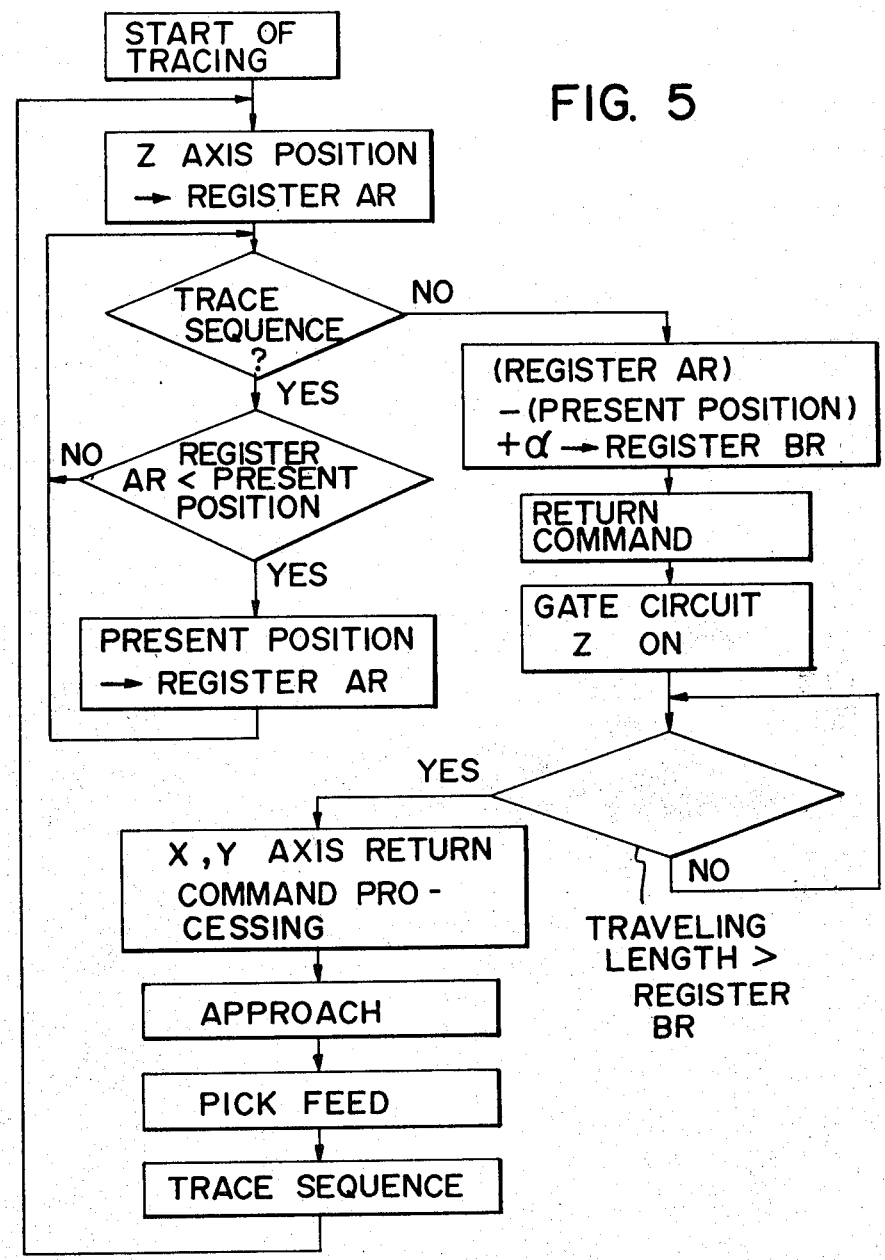
FIGS. 5 and 6 are flowcharts respectively showing the one-way scan trace operation and the both-way scan trace operation.

FIG. 5 shows a flowchart explanatory of the operation of an embodiment of the present invention. Upon starting of the trace, the position of the tracer head in the Z-axis direction, that is, the content of the reversible counter CUNTZ is set in the register AR. In the case of a trace sequence, the content of the register AR and the present position of the tracer head in the Z-axis direction are compared with each other, and if the latter is larger than the former, the register AR is updated. In the case of quick return, the present position of the tracer head is subtracted from the content of the register AR to obtain the value of the distance from the present position of the tracer head to the highest level of the model surface; the aforesaid constant value α is added to the abovesaid value; the added value is set in the register BR; a quick return command is outputted; and the analog gate circuit GC is changed over to the Z-axis drive.

The distance moved by the tracer head in the Z-axis direction is compared with the content of the register BR and when the former becomes larger than the latter, then X, Y return command processing is performed to quickly return the tracer head to the trace starting end in the X-axis direction in the above-described embodiments. Then, the approach operation starts and when it comes to an end, the pick feed takes place and thereafter shifts to the trace sequence.

Figure 6:
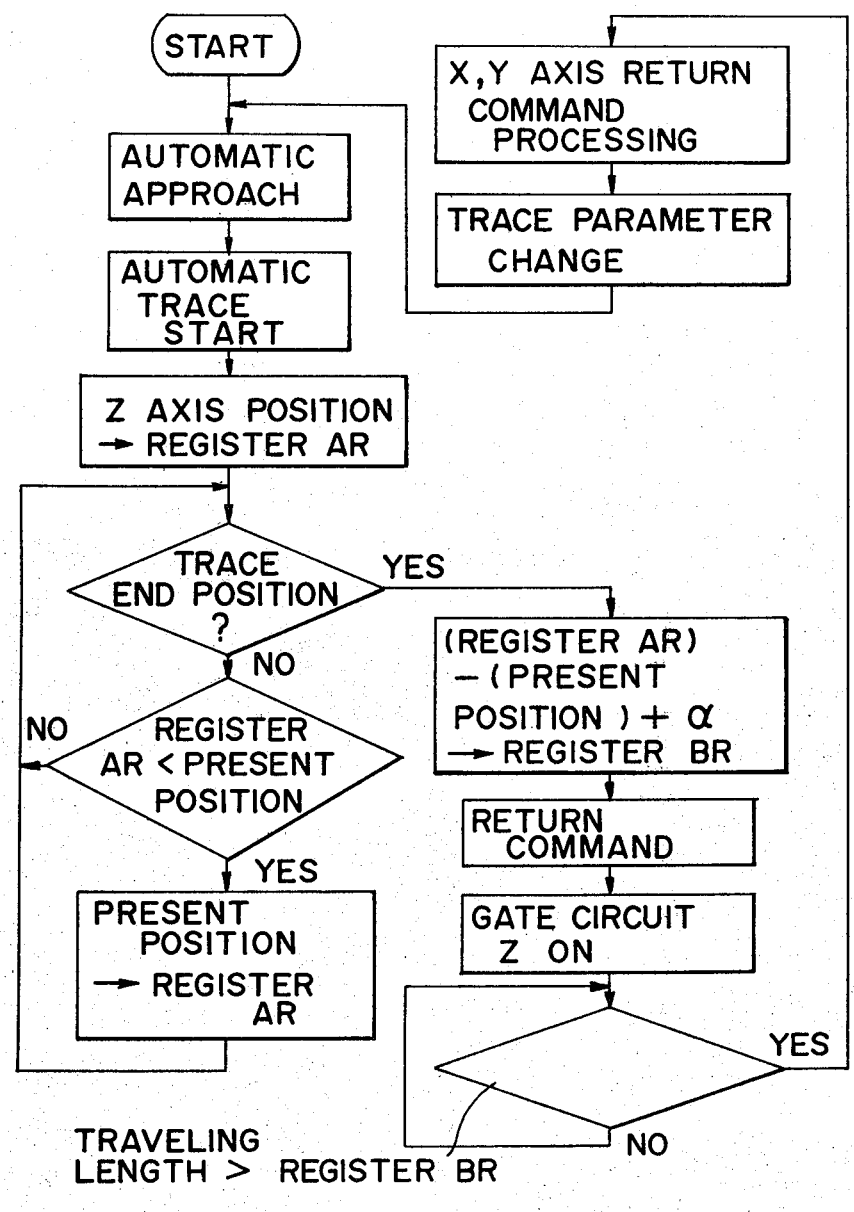

FIG. 6 shows a flowchart of the operation of another embodiment of the present invention as being applied to automatic running for such both-way scan traces as depicted in FIG. 3. This flowchart is substantially the same as that of FIG. 5. When the trace terminating end position, that is, the point D in FIG. 3, is detected by the contents of the reversible counters CUNTX and CUNTY, the trace operation shifts to the quick-return operation. In this case, since the content of the register AR indicates the highest level of the model surface, the present position of the tracer head in the Z-axis direction is subtracted, for instance by subtraction means SUB within the processor CPU as shown in FIG. 4, from the content of the register AR and the aforementioned constant value α is added to the difference value and then the quick-return position in the Z-axis direction is set in the register BR. When the moved distance of the tracer head in the Z-axis direction exceeds the content of the register BR, the X, Y return command processing takes place to bring the tracer head to the point E in FIG. 3, and trace parameters such as the trace direction, the trace velocity and so forth are modified to start the approach operation again. In other words, rough machining can automatically be followed by finish machining.

The foregoing embodiments have been described in connection with the tracer head return in a simultaneous one-axis operation, but the present invention is also applicable to the tracer head return in a simultaneous two-axis or three-axis operation.

As has been described in the foregoing, the tracer control system of the present invention is provided with the reversible counter CUNTZ or like means for detecting the current position of the tracer head in the direction of its return from the trace terminating end, and the register AR or like means for storing a maximum one of the values of the positions of the head detected during tracing. In the return operation from the trace terminating end, the tracer head is quickly returned to the position corresponding to the sum of the abovesaid maximum value and the constant value α; namely, the tracer head is moved up to a position higher than the highest level of the model surface detected during the trace operation. Since the distance of this quick return is automatically set, the tracer head is not excessively returned, thus reducing the quick-return time. Further, since no mechanical setting means such as limit switches are required, the tracer control system of the present invention is easy to operate and highly reliable in operation.

It will be apparent that many modifications and variations may be effected without departing from the scope of the novel concepts of this invention.

What is claimed is:

1. A tracer control system which detects the surface configuration of a model by controlling the relative motion of a tracer head for a selected tracing in a selected mode over the model surface, each said selected tracing comprising at least one trace path along a respective selected direction and respective starting and terminating ends, and to provide a quick return with a predetermined minimum clearance in preparation for the next selected tracing, said control being effected by signals including displacement signals from said tracer head, and input data at least part of which is stored in a memory of said system for defining each said selected tracing said system comprising:

means for detecting during each said selected tracing the current position of the tracer head relative to said model in a selected direction corresponding to which said predetermined clearance is to be provided;

memory means for storing at least one coordinate value corresponding to the maximum value of said detected tracer head position in said selected direction for each said selected tracing; and means for quickly returning the tracer head from the terminating end of a completed selected tracing to the starting end of the next selected tracing, including for first moving the tracer head to a position corresponding to the sum of said maximum value for the completed selected tracing and a predetermined constant value corresponding to said predetermined minimum clearance, followed by said quick return of said tracer head over at least the last trace path of each said selected tracing, wherein the tracer head clears said model by at least said predetermined constant value over at least said last trace path during the quick return.

2. The system of claim 1, comprising
   a table on which the model is mounted and which moves in the X-Y plane as part of said relative motion, each trace path of each said selected tracing being defined by a corresponding predetermined path in the X-Y plane, and said selected direction corresponding to the Z-axis, with said memory means storing only a coordinate value along the Z-axis as said maximum value, said memory means comprising a first memory for storing said maximum value of the detected position of said tracer head in the Z-axis direction for each said selected tracing, means for subtracting the current position of the tracer head in the Z-axis direction at the terminating end of the completed selected tracing from the maximum value stored in the first memory means for that selected tracing to derive the difference therebetween, and means for moving the tracer head in the Z-axis direction to a position corresponding to the sum of said difference and said predetermined constant value as an initial part of said quick return to the starting end of the next selected tracing.

3. The system of claim 2, said means for detecting the current position of the tracer head in the selected direction during a tracing comprising a reversible counter counting pulses from a position detector corresponding to said selected direction.

4. The system of claim 1, 2 or 3, said selected mode comprising one-way tracing.

5. The system of claim 4, said input data comprising pick feed data, each said selected tracing including only one single one of said trace paths, the starting and terminating ends of each said trace path being defined by respective limits along said respective selected direction and the pick feed data.

6. The system of claim 1, 2 or 3, said selected mode comprising both-way tracing, each said selected tracing including a plurality of said trace paths.

7. The system of claim 2, the X, Y and Z axes corresponding to respective machine axes for providing said relative motion.

8. The system of claim 1, said relative motion being provided by three machine axes, and said selected direction corresponding to a direction having components along two of said machine axes.

9. The system of claim 1, said relative motion being provided by three machine axes, and said selected direction corresponding to a direction having components along said three machine axes.

10. The system of claim 2 or 3, said first memory comprising a register for storing said maximum value.

11. The system of claim 10, said first memory including a second register for storing said sum of the respective maximum value and said predetermined constant value for said quick return after each said selected tracing.

* * * * *